Feb. 25, 1930.  W. J. METZGER  1,748,653
SPINDLE AND WHEEL THEREON
Filed Jan. 11, 1929
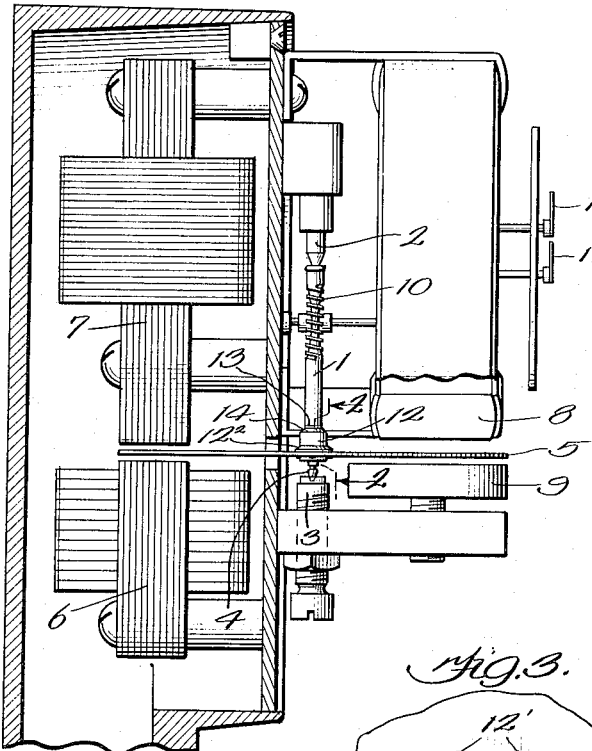
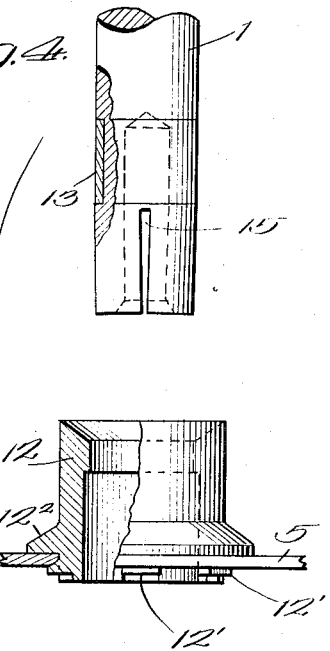
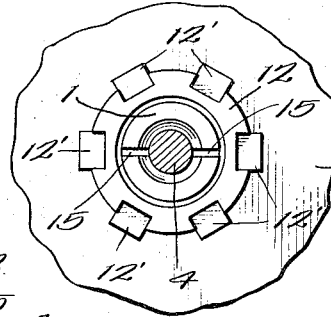
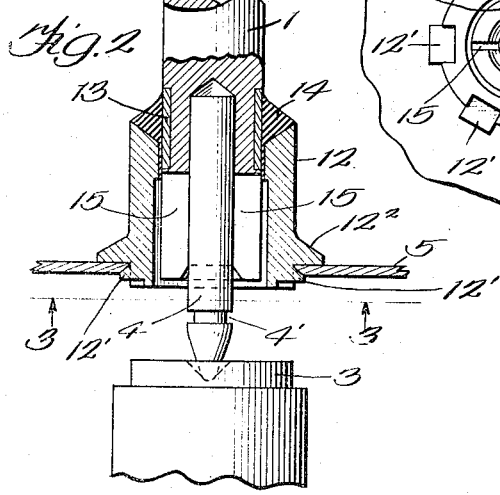
Inventor:
William J. Metzger
By G. L. Gregg Atty.

Patented Feb. 25, 1930

1,748,653

UNITED STATES PATENT OFFICE

WILLIAM J. METZGER, OF LA FAYETTE, INDIANA, ASSIGNOR TO DUNCAN ELECTRIC MANUFACTURING COMPANY, OF LA FAYETTE, INDIANA, A CORPORATION OF ILLINOIS

SPINDLE AND WHEEL THEREON

Application filed January 11, 1929. Serial No. 331,899.

My invention relates to spindles and wheels assembled therewith and is of particular service in electricity meters where the wheels are inclusive of metal in their formation to enable the wheels to serve as meter armatures.

The invention, in one of its aspects, relates particularly to those rotating elements of meters or motors which employ spindles and discs that are made essentially of aluminum. I provide means whereby these discs and spindles may be soldered in assembly. In carrying out this feature of the invention a body is fixed upon the spindle to which solder is adapted to effectively adhere and the disc is provided with a hub to which the solder is also adapted to effectively adhere. This body and hub have the solder directly applied thereto to afford a bond therebetween that serves to hold the disc and spindle in rigid relation.

The invention has as another of its characteristics the provision of a spindle having a pivot pin in its lower end with the bearing point of the pin closely approached to the plane of the disc or wheel whereby the center of gravity of the rotating element that includes the spindle and disc may be placed as low as is practicable. The lower end of the spindle is formed with a bore coaxial therewith and in which the upper portion of the pivot pin is received. A portion of the spindle that intervenes between its lower end and the mid-portion of the bore is split lengthwise of the spindle and is slightly contracted to make one diameter of the lower portion of the bore smaller than the diameter of the pin whereby the pin is gripped by the spindle when forced into place. The hub of the disc surrounds the spindle and is secured to the spindle above the split portion thereof and is free of the spindle, where the spindle is split to permit of the expansion of the split portion of the spindle by the pin when the pin is forced into place. The spindle preferably terminates, at its lower end, at the plane of the disc, the bearing point of the pin being just sufficiently below the disc to permit of the proper disposition of the spindle and disc with relation to the parts that cooperate with these parts.

The invention will be more fully explained in connection with the accompanying drawing in which Fig. 1 is a sectional elevation of an induction electricity meter whose rotating element contains the structural characteristics of my invention; Fig. 2 is an elevation, on a larger scale, of portions illustrated in Fig. 1, parts being shown in section; Fig. 3 is a sectional view on line 3—3 of Fig. 2 looking upwardly; and Fig. 4 illustrates component parts of the structure of my invention in separated relation, portions being shown in section.

The meter illustrated is inclusive of an upright spindle 1 which is carried at its ends upon and between bearings 2 and 3. A pivot pin 4 is inserted within the lower end of the spindle, as will be more fully hereinafter set forth, the lower end of the pin being carried by the bearing 3 which is of cup formation where it receives the pin. A horizontal armature disc 5, preferably of aluminum, is carried by the spindle, being preferably rigidly secured thereto in a manner more fully hereinafter set forth. In an induction electricity meter this disc is turned proportionately to the energy consumed by the load. To this end a magnet system is employed with which the disc is in inductive relation. This magnet system is inclusive of a current or series magnet 6 and a pressure magnet 7. The speed of the disc is checked by the permanent magnet 8 which is located upon one side of the disc, there being a keeper 9 on the other side of the disc for directing the flux threading the magnet 8 through the disc. The meter parts described constitute a meter motor whose armature disc 5 turns proportionately to the wattage in a manner well known to those familiar with the art. A worm 10 is provided upon the spindle 1 and is in mesh with the initial gear of a counting train that drives the measuring pointers 11 of the meter. The disc is provided with a metallic hub which has its lower end passing through the disc, portions 12' of the hub being preferably peened against the bottom of the disc to clamp the upper face of the disc firmly against the annular hub shoulder 12². An annular groove or recess is formed in the spindle a short distance above its lower end. The upper end of the hub 12 terminates midway between the ends of said annular groove. A metallic collar 13 is compressed into said groove or recess. The parts 12 and 13 are made of a metal to which solder will readily adhere, such as brass. An annular or sleeve-like body of solder 14 is applied to the upper portion of the hub 12 and to the exterior surface of the collar 13 whereby these two parts are brought into rigid assembly with the consequence that the spindle and disc are firmly united, a result which could not be satisfactorily secured if it were attempted to solder the disc directly to the spindle when these two parts are made of aluminum.

The lower end of the spindle is desirably located at the plane of the disc being thus surrounded by the hub nearly throughout the length of the hub. The bore of the hub is enlarged below the collar 13, the portion of the spindle which is received in the enlarged bore portion of the hub being provided with slots 15 that extend lengthwise of the spindle. The slots 15 are in one diametrical plane of the spindle, the portions of the spindle between which these slots are disposed being pinched toward each other as shown in Fig. 4. When the pivot pin 14 is inserted within the bore of the spindle the portions of the spindle that margin the slots 15 are spread apart so that the pin is firmly gripped to hold it coaxial with the spindle. Spreading of the pinched lower portions of the spindle is permitted by the enlarged portion of the bore 12 in which these spindle portions are received, there being ample clearance between the spindle, where split, and the surrounding portion of the hub to permit of the free spreading of the spindle by the pin. The upper end of the pin is surrounded by the collar 13, the splitting of the spindle preferably terminating short of the zone of the collar. The portion of the bore of the spindle which is surrounded by the collar is relied upon to locate the pin exactly coaxial with the spindle and to prevent the disturbance of this alignment by the action of the spindle, where split, upon the pin. The pivot pin is desirably provided with an annular groove 4' for the reception of a portion of a pin dislodging tool. This tool may also be employed to insert the pin, it being desirable to prevent direct contact of the hand in applying the pin so that the pin will not receive perspiration that might cause it to rust.

Changes may be made without departing from the invention.

Having thus described my invention, I claim:

1. The combination with a spindle having a bore extending from one end toward the other of the spindle; of a wheel which has a hub secured to and surrounding the spindle between its ends and positioning the wheel close to the first aforesaid spindle end; and a bearing pin inserted in said bore from the first aforesaid spindle end and there having expanding engagement with the spindle, said pin having its outer or bearing end extending from the spindle beyond the wheel, wherein the spindle is slotted at the pin receiving end thereof to render the spindle expansible and wherein the spindle is non-expansible in the region of the inner end of the bearing pin.

2. The combination with a spindle formed of aluminum and having a body of material thereon to which solder may effectively adhere; of a disc of aluminum having a hub which is inclusive of material to which solder may effectively adhere; and a body of solder applied to said body upon the spindle and to the hub where the solder may effectively adhere.

In witness whereof, I hereunto subscribe my name.

WILLIAM J. METZGER.